US012585749B2

(12) United States Patent
Benkreira et al.

(10) Patent No.: US 12,585,749 B2
(45) Date of Patent: *Mar. 24, 2026

(54) PROVIDING AN AUGMENTED REALITY OVERLAY TO SECURE INPUT DATA

(71) Applicant: Capital One Services, LLC, McLean, VA (US)

(72) Inventors: Abdelkadar M'Hamed Benkreira, Washington, DC (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 219 days.

This patent is subject to a terminal disclaimer.

(21) Appl. No.: 17/445,014

(22) Filed: Aug. 13, 2021

(65) Prior Publication Data

US 2021/0374225 A1 Dec. 2, 2021

Related U.S. Application Data

(63) Continuation of application No. 16/412,916, filed on May 15, 2019, now Pat. No. 11,113,381, which is a
(Continued)

(51) Int. Cl.
*G06F 21/36* (2013.01)
*G06F 3/044* (2006.01)
(Continued)

(52) U.S. Cl.
CPC .............. *G06F 21/36* (2013.01); *G06F 3/044* (2013.01); *G06F 21/35* (2013.01); *G06F 21/83* (2013.01);
(Continued)

(58) Field of Classification Search
None
See application file for complete search history.

(56) References Cited

U.S. PATENT DOCUMENTS 9,792,594 B1 * 10/2017 Bayha .............. G06Q 20/40145
10,331,874 B1 6/2019 Benkreira
(Continued)

FOREIGN PATENT DOCUMENTS

EP 3136275 A1 3/2017

OTHER PUBLICATIONS

John R. Snyder, Quantum Leap Forward. Marine Log; New York vol. 120, Issue 3, Mar. 2015—3 pages. (Year: 2015).*
(Continued)

*Primary Examiner* — Benjamin S Brindley
(74) *Attorney, Agent, or Firm* — Harrity & Harrity, LLP

(57) ABSTRACT

A device may receive an input that indicates a request to initiate a transaction at an ATM device. The device may instruct the user to capture one or more images of the ATM device. The device may determine that an image has been captured and process the image to determine first information that identifies the ATM device. The device may send the first information to a server device and receive a signal that indicates the ATM device has been validated. The device may cause an augmented reality (AR) overlay to be displayed, wherein the AR overlay includes second information related to authenticating the user to the ATM device. The device may determine whether a user action is performed with respect to the second information included in the AR overlay, and perform a device action related to the second information, the ATM device, or the AR overlay.

20 Claims, 9 Drawing Sheets

100 ⟶

145
The user device displays an Augmented Reality (AR) overlay
(e.g., numbers for a keypad in a random order)

Enter PIN

Enter PIN

ATM

AR overlay

150
The user device determines whether a user performs an action (e.g., the user enters a PIN on the ATM device keypad according to the AR overlay number layout)

155
The user device performs an action based on the user performing an action (e.g., displays a supplemental AR overlay that presents a user authorization message, translates text on the ATM device display, presents additional information, etc.)

Related U.S. Application Data continuation of application No. 16/001,860, filed on Jun. 6, 2018, now Pat. No. 10,331,874.

(51) Int. Cl.

| | |
|---|---|
| *G06F 21/35* | (2013.01) |
| *G06F 21/83* | (2013.01) |
| *G06Q 20/10* | (2012.01) |
| *G06Q 20/32* | (2012.01) |
| *G06T 19/00* | (2011.01) |
| *G07F 19/00* | (2006.01) |

(52) U.S. Cl.

CPC ....... *G06Q 20/1085* (2013.01); *G06Q 20/322* (2013.01); *G06T 19/006* (2013.01); *G07F 19/201* (2013.01)

(56) References Cited

U.S. PATENT DOCUMENTS

| 2003/0182558 | A1* | 9/2003 | Lazzaro | G07F 19/201 |
| | | | | 713/183 |
| 2011/0018903 | A1* | 1/2011 | Lapstun | G06F 3/013 |
| | | | | 345/633 |
| 2014/0040127 | A1* | 2/2014 | Chatterjee | G06Q 20/322 |
| | | | | 705/41 |
| 2014/0046842 | A1* | 2/2014 | Irudayam | G06Q 20/32 |
| | | | | 235/379 |
| 2014/0263618 | A1* | 9/2014 | McCarthy | G06Q 40/02 |
| | | | | 235/379 |
| 2016/0092877 | A1* | 3/2016 | Chew | G06Q 20/4012 |
| | | | | 705/72 |
| 2016/0307001 | A1* | 10/2016 | Dow | G06F 3/0304 |
| 2017/0032573 | A1 | 2/2017 | Dow et al. | |
| 2017/0262844 | A1* | 9/2017 | Laracey | G06F 21/335 |
| 2018/0158053 | A1* | 6/2018 | Adams | G02B 27/017 |
| 2019/0377862 | A1 | 12/2019 | Benkreira et al. | |

OTHER PUBLICATIONS

Tommy Palladino, Your Banking App Could Soon Help You Locate the Nearest ATM in AR. Next Reality News (https://next.reality.news/news/your-banking-app-could-soon-help-you-locate-nearest-atm-ar-0180060/), Oct. 23, 2017, 5 pages. (Year: 2017).*

Anonymous., "Bluetooth—Wikipedia," Oct. 7, 2017, 28 pages, XP055552456. [retrieved on Feb. 6, 2019] Retrieved from the Internet: [URL:https://en.wikipedia.org/w/index.php?title=Bluetooth&oldid=804205348].

De Guzman J.A., et al., "Security and Privacy Approaches in Mixed Reality: A Literature Survey," https://arxiv.org/pdf/1802.05797.pdf, Feb. 15, 2018, 33 pages.

Extended European Search report for Application No. EP19178382.8, mailed on Aug. 2, 2019, 14 pages.

Mobile Payments Today, "Augmented Reality Enhances RBC Banking App for Branch, ATM Location," https://www.mobilepaymentstoday.com/news/augmented-reality-enhances-rbc-ban kingapp-for-branch-atm-location/, Feb. 21, 2018, 2 pages.

Palladino T., "Your Banking App Could Soon Help You Locate the Nearest ATM in AR," Oct. 23, 2017, 5 pages. Retrieved from Internet:[URL:https://next.reality.news/news/your-banking-app-could-soon-help-you-locate-nearest-atm-ar-0180660/].

Roesner F., et al., "Security and Privacy for Augmented Reality Systems," https://arsec.cs.washington.edu/files/arsec-cacm2014-preprint.pdf, Nov. 2012, 10 pages.

Snyder, J.R., "Quantum Leap Forward," Marine Log, Mar. 2015, New York, vol. 120 (3), 3 pages.

U.S. Bancorp, U.S. Bank Introduces Augmented Reality iPhone® Application to Find Branches and ATMs, https://www.businesswire.com/news/home/20120411 005193/en/U.S.-BankIntroduces- Augmented-Reality-iPhone%C2%AE-Application, Apr. 11, 2012, 2 pages.

* cited by examiner

100

115
The user device prompts the user to take a picture of the ATM device

Take a picture of the ATM

Begin

120
The user device detects that an image is being captured

Image

Take Picture

125
The user device processes the image to determine an ATM device identifier

Image

ATM

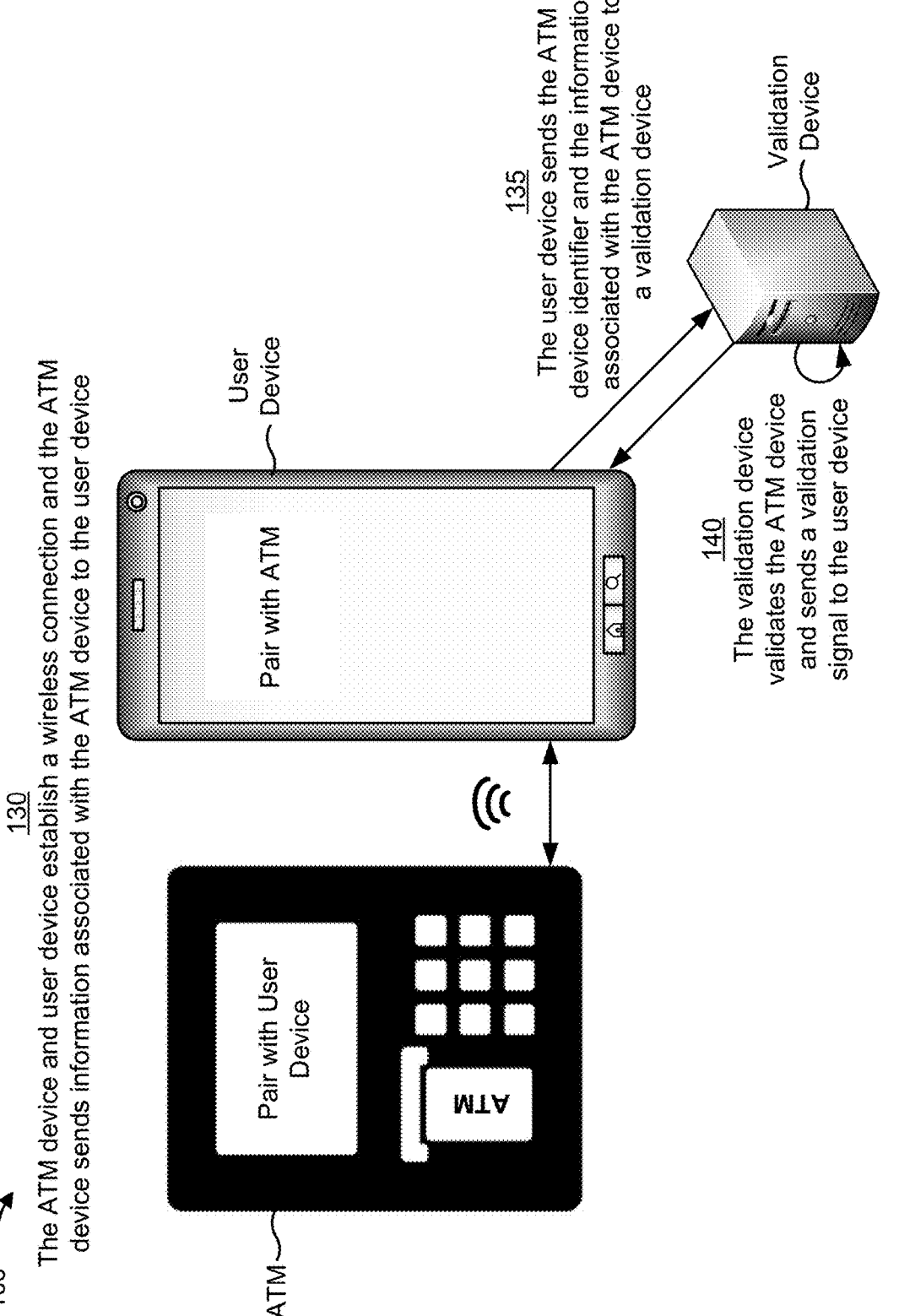

100

130
The ATM device and user device establish a wireless connection and the ATM device sends information associated with the ATM device to the user device User Device Pair with ATM

ATM

Pair with User Device

135
The user device sends the ATM device identifier and the information associated with the ATM device to a validation device 140
The validation device validates the ATM device and sends a validation signal to the user device Validation Device

FIG. 1C

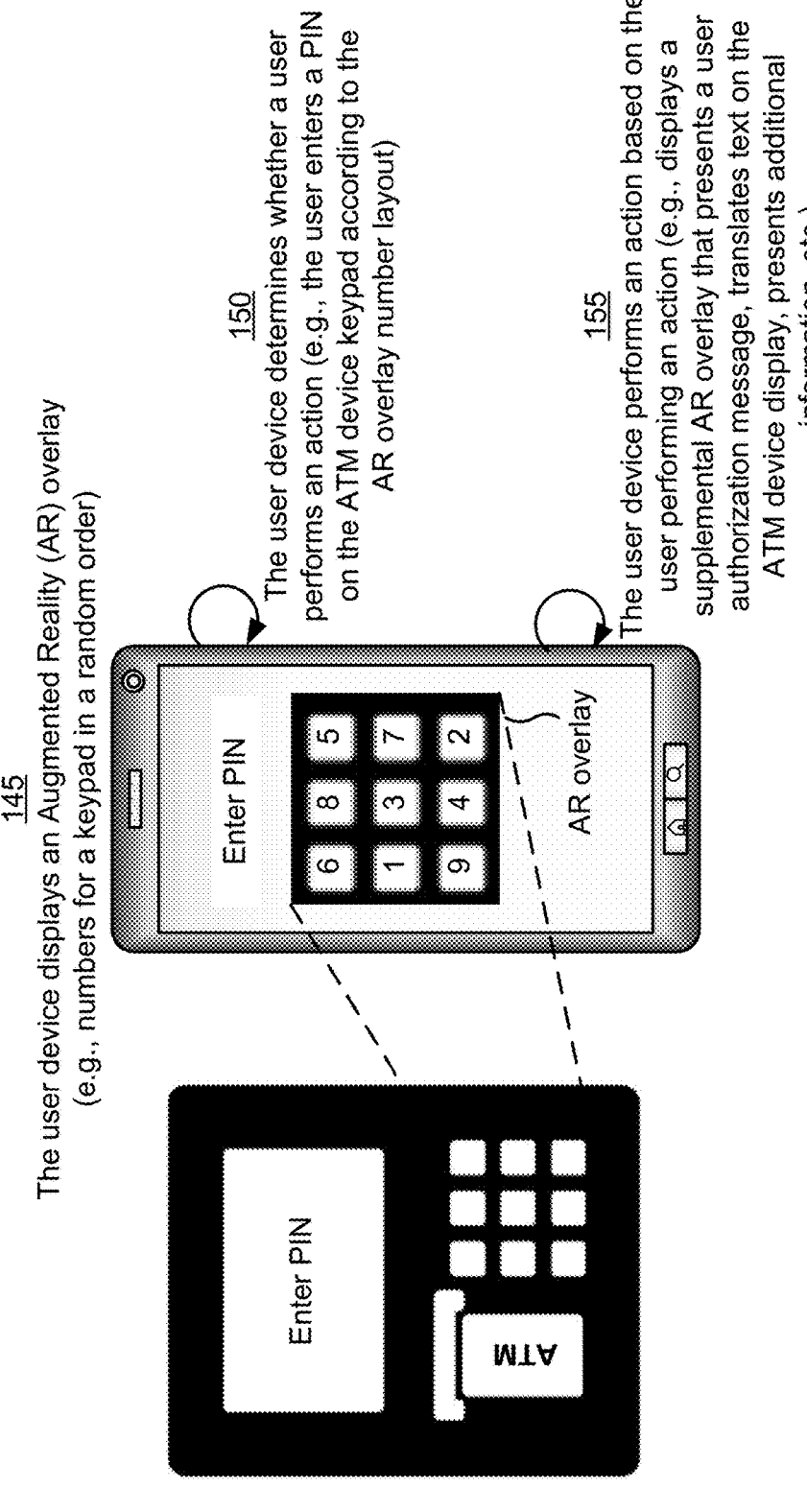

145
The user device displays an Augmented Reality (AR) overlay (e.g., numbers for a keypad in a random order)

150
The user device determines whether a user performs an action (e.g., the user enters a PIN on the ATM device keypad according to the AR overlay number layout)

155
The user device performs an action based on the user performing an action (e.g., displays a supplemental AR overlay that presents a user authorization message, translates text on the ATM device display, presents additional information, etc.)

Enter PIN 5  8  6
7  3  1
2  4  9

AR overlay

Enter PIN

ATM

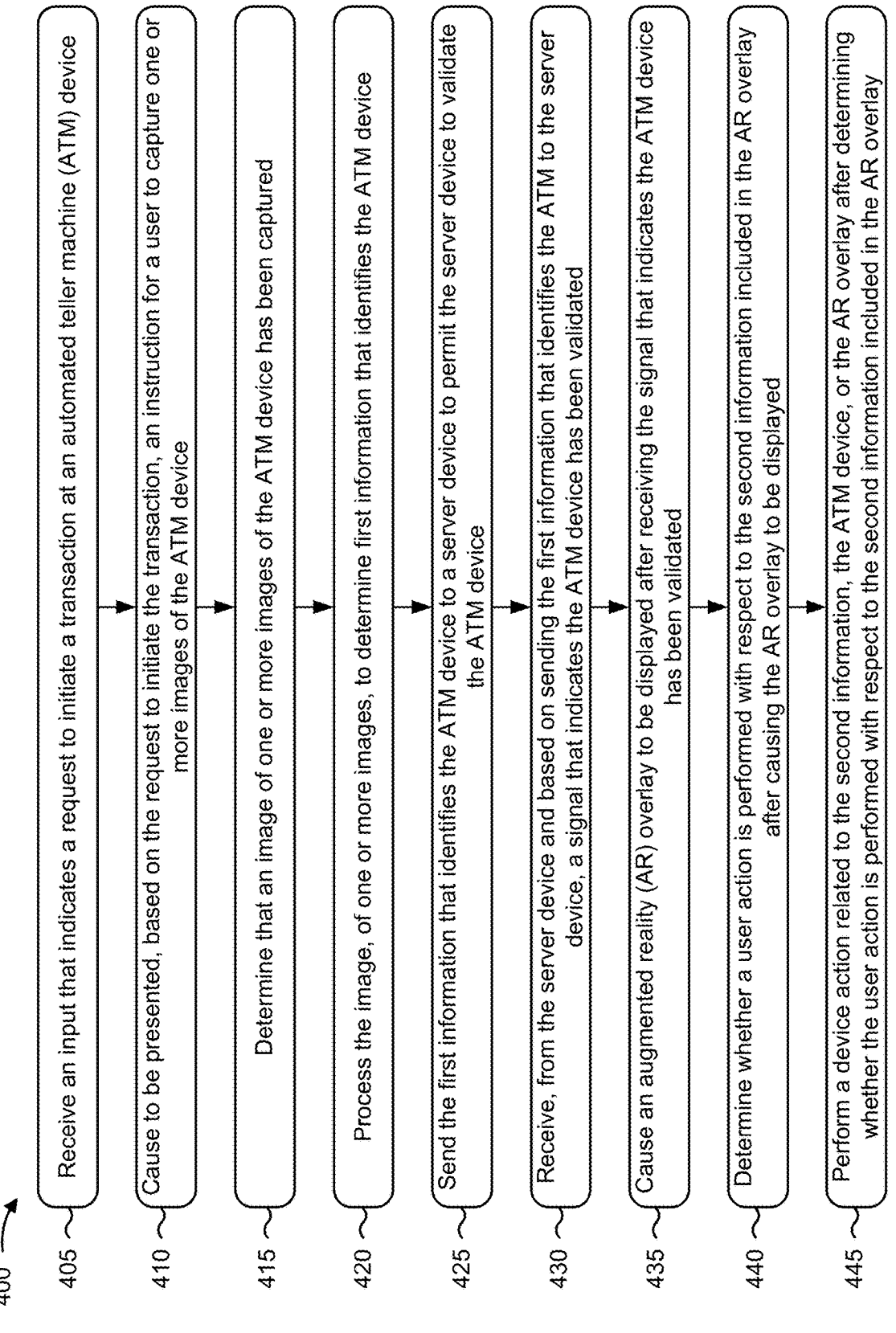

400

405 — Receive an input that indicates a request to initiate a transaction at an automated teller machine (ATM) device 410 — Cause to be presented, based on the request to initiate the transaction, an instruction for a user to capture one or more images of the ATM device 415 — Determine that an image of one or more images of the ATM device has been captured 420 — Process the image, of one or more images, to determine first information that identifies the ATM device 425 — Send the first information that identifies the ATM device to a server device to permit the server device to validate the ATM device 430 — Receive, from the server device and based on sending the first information that identifies the ATM to the server device, a signal that indicates the ATM device has been validated 435 — Cause an augmented reality (AR) overlay to be displayed after receiving the signal that indicates the ATM device has been validated 440 — Determine whether a user action is performed with respect to the second information included in the AR overlay after causing the AR overlay to be displayed 445 — Perform a device action related to the second information, the ATM device, or the AR overlay after determining whether the user action is performed with respect to the second information included in the AR overlay

FIG. 4

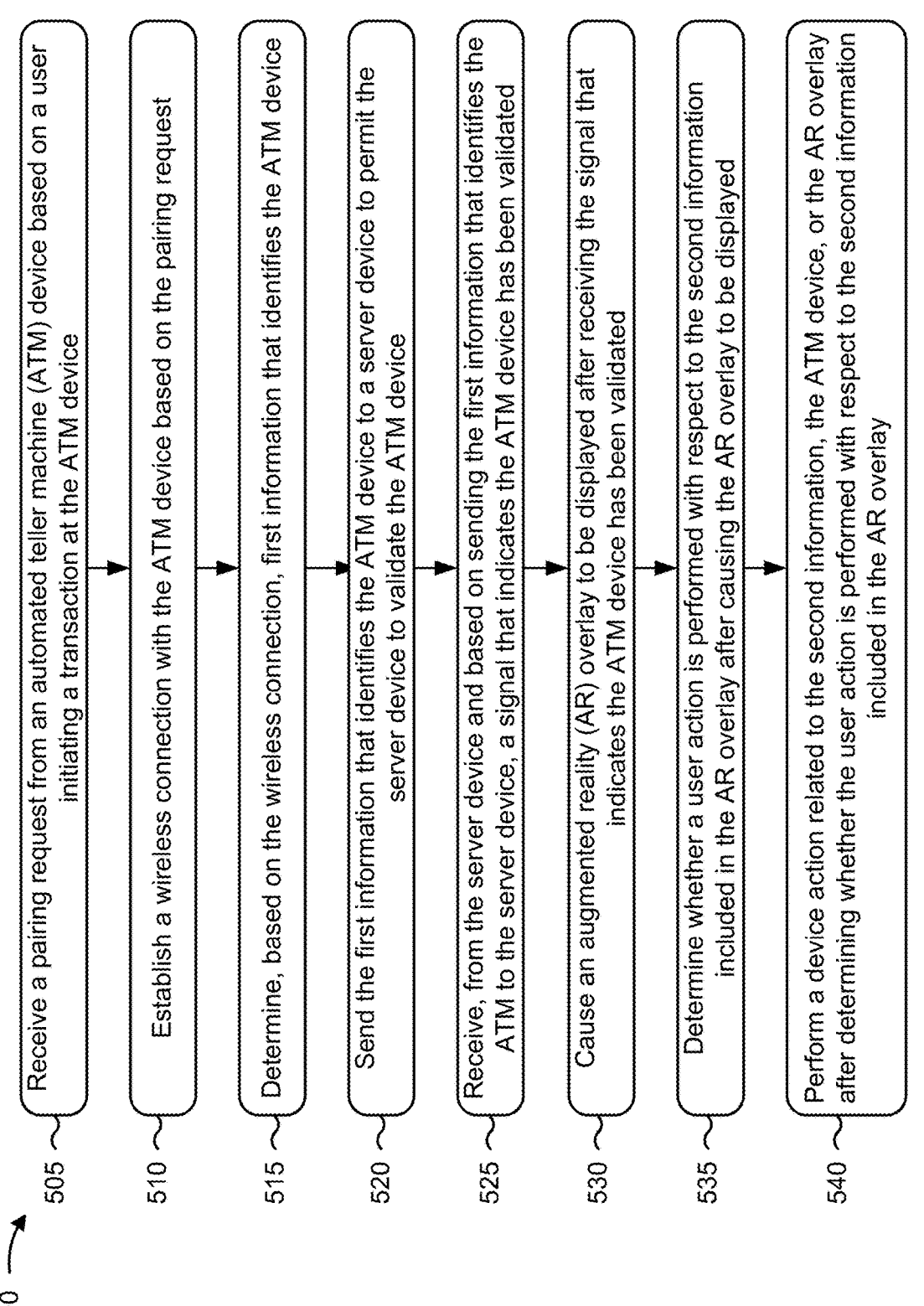

500

505 — Receive a pairing request from an automated teller machine (ATM) device based on a user initiating a transaction at the ATM device 510 — Establish a wireless connection with the ATM device based on the pairing request 515 — Determine, based on the wireless connection, first information that identifies the ATM device 520 — Send the first information that identifies the ATM device to a server device to permit the server device to validate the ATM device 525 — Receive, from the server device and based on sending the first information that identifies the ATM to the server device, a signal that indicates the ATM device has been validated 530 — Cause an augmented reality (AR) overlay to be displayed after receiving the signal that indicates the ATM device has been validated 535 — Determine whether a user action is performed with respect to the second information included in the AR overlay after causing the AR overlay to be displayed 540 — Perform a device action related to the second information, the ATM device, or the AR overlay after determining whether the user action is performed with respect to the second information included in the AR overlay

FIG. 5

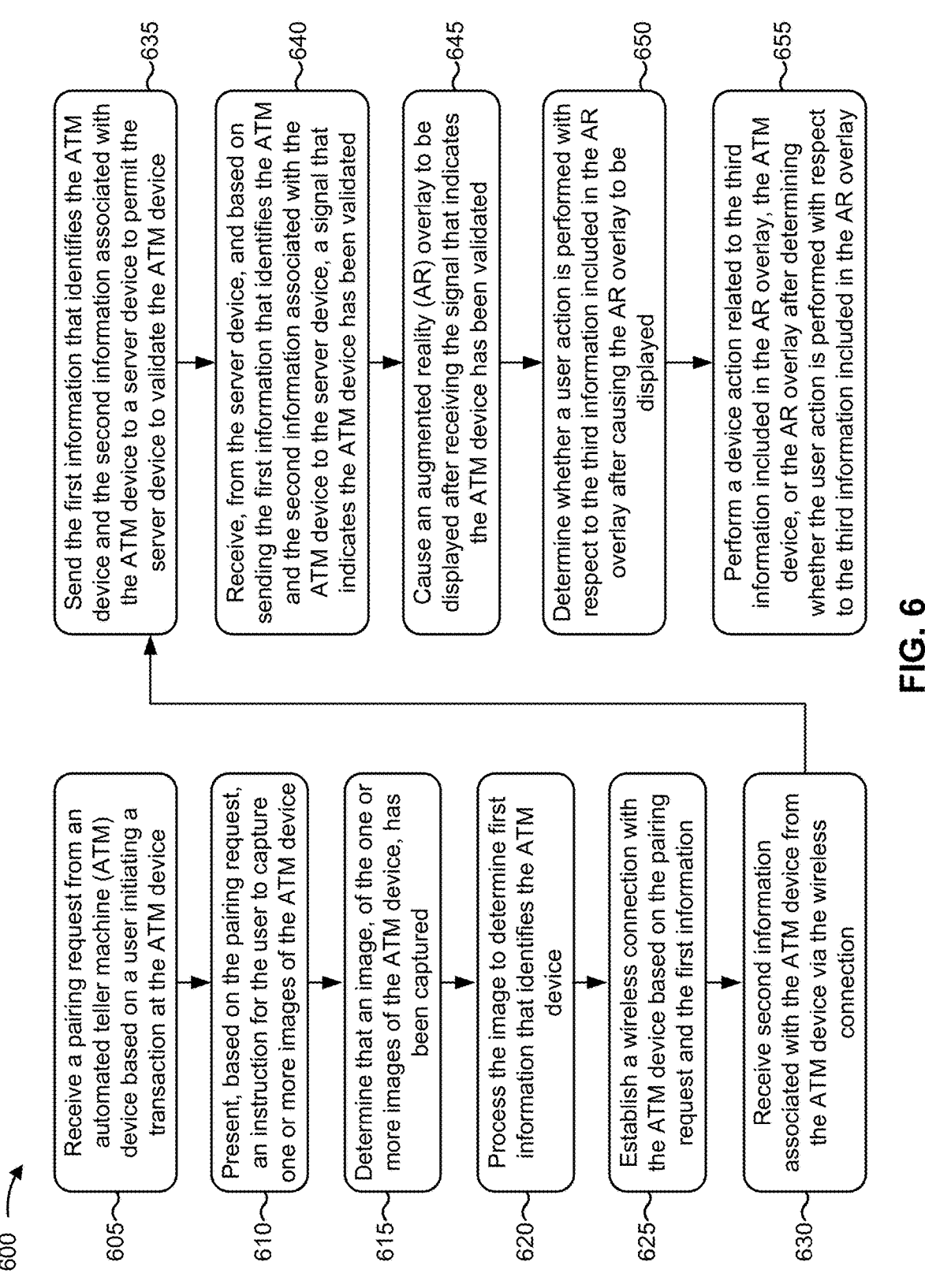

600

605 — Receive a pairing request from an automated teller machine (ATM) device based on a user initiating a transaction at the ATM device 610 — Present, based on the pairing request, an instruction for the user to capture one or more images of the ATM device 615 — Determine that an image, of the one or more images of the ATM device, has been captured 620 — Process the image to determine first information that identifies the ATM device 625 — Establish a wireless connection with the ATM device based on the pairing request and the first information 630 — Receive second information associated with the ATM device from the ATM device via the wireless connection 635 — Send the first information that identifies the ATM device and the second information associated with the ATM device to a server device to permit the server device to validate the ATM device 640 — Receive, from the server device, and based on sending the first information that identifies the ATM and the second information associated with the ATM device to the server device, a signal that indicates the ATM device has been validated 645 — Cause an augmented reality (AR) overlay to be displayed after receiving the signal that indicates the ATM device has been validated 650 — Determine whether a user action is performed with respect to the third information included in the AR overlay after causing the AR overlay to be displayed 655 — Perform a device action related to the third information included in the AR overlay, the ATM device, or the AR overlay after determining whether the user action is performed with respect to the third information included in the AR overlay

FIG. 6

PROVIDING AN AUGMENTED REALITY OVERLAY TO SECURE INPUT DATA

RELATED APPLICATIONS

This application is a continuation of U.S. patent application Ser. No. 16/412,916, filed May 15, 2019, which is a continuation of U.S. patent application Ser. No. 16/001,860, filed Jun. 6, 2018 (now U.S. Pat. No. 10,331,874), which are incorporated herein by reference in their entireties.

BACKGROUND

Augmented reality (AR) involves modifying or augmenting a live view of a physical, real-world environment, via computer-generated or extracted input (such as sound, video, graphics, haptics, global positioning system (GPS) data, and/or the like), to enhance an individual's current perception of reality. Augmented reality alters one's current perception of a real-world environment, unlike virtual reality, which replaces the real-world environment with a simulated environment.

SUMMARY

According to some possible implementations, a device may comprise one or more memory devices and one or more processors, operatively coupled to the one or more memory devices, to receive an input that indicates a request to initiate a transaction at an automated teller machine (ATM) device. The one or more processors may cause to be presented, based on the request to initiate the transaction, an instruction for a user to capture one or more images of the ATM device, and determine that an image of one or more images of the ATM device has been captured. The one or more processors may process the image, of one or more images, to determine first information that identifies the ATM device, and send the first information that identifies the ATM device to a server device to permit the server device to validate the ATM device. The one or more processors may receive, from the server device and based on sending the first information that identifies the ATM to the server device, a signal that indicates the ATM device has been validated. The one or more processors may cause an augmented reality (AR) overlay to be displayed after receiving the signal that indicates the ATM device has been validated, wherein the AR overlay includes second information related to authenticating the user to the ATM device, and determine whether a user action is performed with respect to the second information included in the AR overlay after causing the AR overlay to be displayed. The one or more processors may perform a device action related to the second information, the ATM device, or the AR overlay after determining whether the user action is performed with respect to the second information included in the AR overlay.

According to some possible implementations, a non-transitory computer-readable medium may store instructions that comprise one or more instructions that, when executed by one or more processors, may cause the one or more processors to receive a pairing request from an automated teller machine (ATM) device based on a user initiating a transaction at the ATM device. The one or more instructions, when executed by the one or more processors, may cause the one or more processors to establish a wireless connection with the ATM device based on the pairing request and determine, based on the wireless connection, first information that identifies the ATM device. The one or more instructions, when executed by the one or more processors, may cause the one or more processors to send the first information that identifies the ATM device to a server device to permit the server device to validate the ATM device, and receive, from the server device and based on sending the first information that identifies the ATM to the server device, a signal that indicates the ATM device has been validated. The one or more instructions, when executed by the one or more processors, may cause the one or more processors to cause an augmented reality (AR) overlay to be displayed after receiving the signal that indicates the ATM device has been validated, wherein the AR overlay includes second information related to authenticating the user to the ATM device. The one or more instructions, when executed by the one or more processors, may cause the one or more processors to determine whether a user action is performed with respect to the second information included in the AR overlay after causing the AR overlay to be displayed, and perform a device action related to the second information, the ATM device, or the AR overlay after determining whether the user action is performed with respect to the second information included in the AR overlay.

According to some possible implementations, a method may include receiving, by a user device, a pairing request from an automated teller machine (ATM) device based on a user initiating a transaction at the ATM device, and presenting, by the user device and based on the pairing request, an instruction for the user to capture one or more images of the ATM device. The method may include determining, by the user device, that an image, of the one or more images of the ATM device, has been captured, and processing, by the user device, the image to determine first information that identifies the ATM device. The method may include establishing, by the user device, a wireless connection with the ATM device based on the pairing request and the first information, and receiving, by the user device, second information associated with the ATM device from the ATM device via the wireless connection. The method may include sending, by the user device, the first information that identifies the ATM device and the second information associated with the ATM device to a server device to permit the server device to validate the ATM device, and receiving, by the user device, from the server device, and based on sending the first information that identifies the ATM and the second information associated with the ATM device to the server device, a signal that indicates the ATM device has been validated. The method may include causing, by the user device, an augmented reality (AR) overlay to be displayed after receiving the signal that indicates the ATM device has been validated, wherein the AR overlay includes third information related to authenticating the user to the ATM device. The method may include determining, by the user device, whether a user action is performed with respect to the third information included in the AR overlay after causing the AR overlay to be displayed, and, performing, by the user device, a device action related to the third information included in the AR overlay, the ATM device, or the AR overlay after determining whether the user action is performed with respect to the third information included in the AR overlay.

BRIEF DESCRIPTION OF THE DRAWINGS

FIGS. 1A-1D are diagrams of an example implementation described herein.

FIG. 4 is a flow chart of an example process for providing an augmented reality overlay to secure input data.

FIG. 5 is a flow chart of an example process for providing an augmented reality overlay to secure input data.

FIG. 6 is a flow chart of an example process for providing an augmented reality overlay to secure input data.

DETAILED DESCRIPTION

Figure 1A:
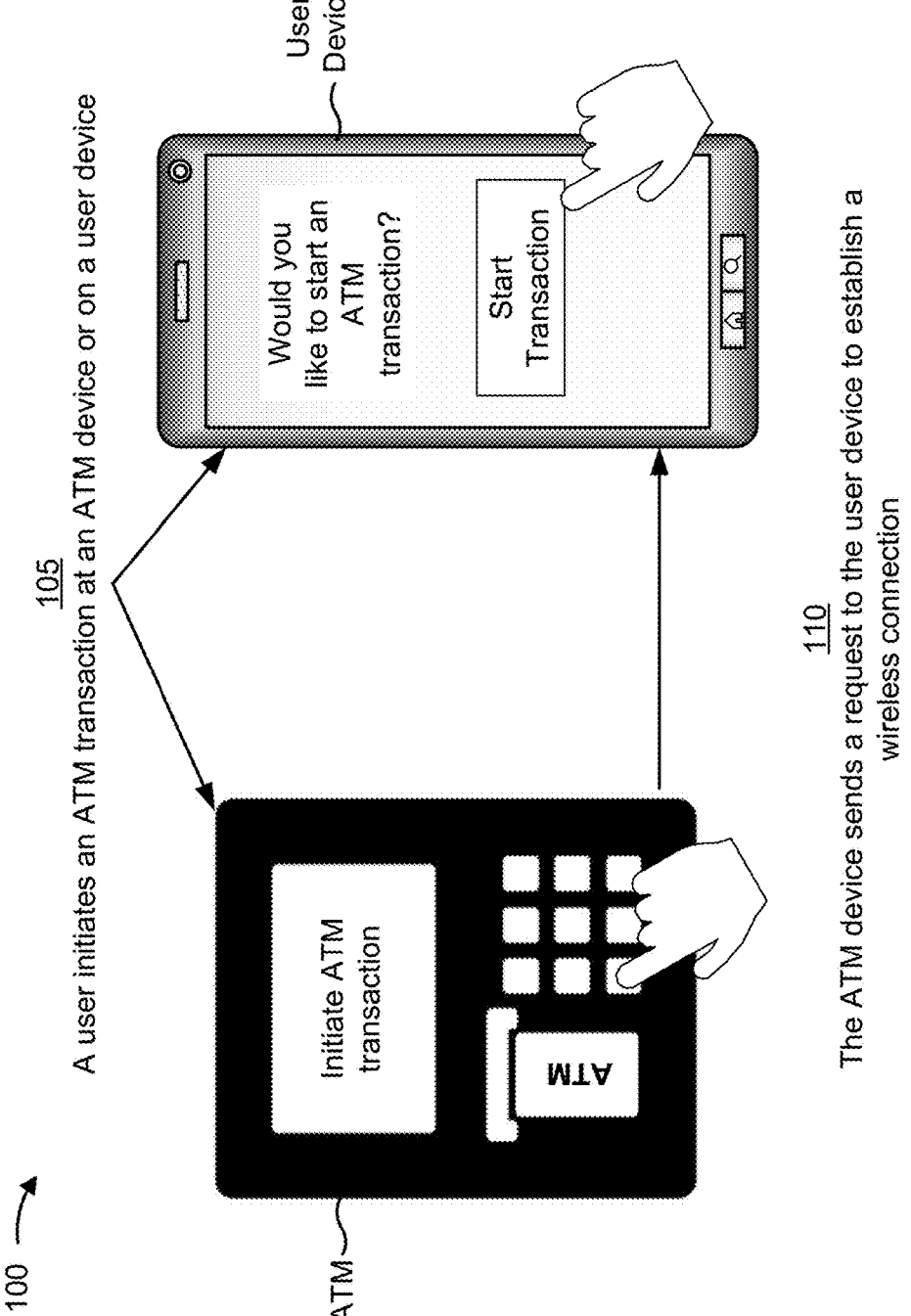

The following detailed description of example implementations refers to the accompanying drawings. The same reference numbers in different drawings may identify the same or similar elements.

In order to conduct an automated teller machine (ATM) transaction, a user must insert a transaction card into (or swipe a transaction card through) a card reader of an ATM device, and enter a corresponding personal identification number (PIN) using a touch screen display or a keypad of the ATM device. This introduces the possibility of theft of the user's account data since a malicious user can easily install skimmers, cameras, and/or the like to illicitly capture the user's PIN or transaction card data.

Some implementations, described herein, provide a user device that is capable of capturing an image of an ATM device, communicating with a validation device, and connecting with the ATM device. In some implementations, the user device is capable of providing an augmented reality (AR) overlay that is displayed over the physical input interface of the ATM device. In some implementations, the AR overlay presents characters and/or symbols in a random layout. In some implementations, the AR overlay presents buttons of varying sizes, of varying shapes, and/or at varying locations. In some implementations, the user may interact with the physical input interface of the ATM device in a manner that corresponds with information presented in the AR overlay, such as the user entering a PIN into a keypad according to the random layout presented in the AR overlay. In some implementations, the user device provides a supplemental AR overlay after a user action has been performed at the ATM device, such as an AR overlay presenting additional instructions to conduct the ATM transaction.

In this way, the user device can assist with authenticating a user to an ATM device, while minimizing the possibility of theft of the user's account data. This improves the ATM transaction experience by improving the security of the ATM transaction. In addition, an ATM device manufacturer can provide an ATM device that includes fewer components that identify or authenticate the user (e.g., a camera, a biometric reader, and/or the like), which simplifies the design and manufacture of the ATM device, thereby reducing costs. This also reduces or eliminates the possibility of wear and tear of the ATM device that would otherwise utilize the components that identify or authenticate the user.

FIGS. 1A-1D are diagrams of an example implementation 100 described herein. In some implementations, example implementation 100 may include a user device, an automated teller machine (ATM) device, and a validation device. In example implementation 100, the user device may be a communication and/or computing device, such as a mobile phone, a smartphone, a laptop computer, a tablet computer, a wearable communication device (e.g., a pair of smart eyeglasses, a smart wristwatch, etc.), and/or the like. In some implementations, the user device may include a camera, a display, and a wireless transceiver (e.g., a Bluetooth-based communication interface and/or the like). In some implementations, the user device may provide information, for display, based on executing an application (e.g., an application to facilitate performing a transaction at an ATM device). In some implementations, the user device may cause an augmented reality (AR) overlay to be provided for display (e.g., superimposed on an image) to provide the information.

Additionally, in example implementation 100, the ATM device may be an electronic telecommunications device that enables customers of financial institutions to perform financial transactions, such as a cash withdrawal, a deposit, a transfer of funds, or obtaining account information, at any time and without the need for direct interaction with bank staff. The ATM device may include a display device, a physical input interface (e.g., a keypad, a keyboard, a touchscreen display, a touch capacitive screen display, and/or the like), a slot for receiving a transaction card, and/or one or more other components (e.g., a card reader, a printer for printing a receipt, a camera for capturing an image of the user, and/or the like).

In some implementations, the physical input interface may enable a user of the ATM device to input sensitive information (e.g., a personal identification number (PIN), a user identifier, and/or the like), view sensitive information (e.g., an account number, an account balance, an image of a keypad, and/or the like), and/or the like. In one example, the user may utilize the physical input interface to input a PIN of the user, to input an amount of money to withdraw, to select an account from which to withdraw the money, and/or the like.

In some implementations, the keypad may include keys, with particular numbers (e.g., 0 through 9), that may be used to enter a PIN of the user, an enter key that may be used to enter or input the PIN provided by the user, a clear key that may be used to clear the PIN input by the user, a cancel key that may be used to cancel a transaction, and/or the like. In some implementations, information input via the keypad may be displayed via the physical input interface and/or the display device.

Additionally, in example implementation 100, the validation device may be a computing device, a server, a cloud computing device, and/or the like. The validation device may assist in validating, authenticating, or identifying a device to another device (e.g., validate the credentials of an ATM device to a user device and/or the like).

Turning now to FIG. 1A, assume that a user wants to initiate a transaction with an ATM device (e.g., to withdraw money from the user's bank account). As shown by reference number 105, the user may interact with the ATM device to initiate the transaction. For example, the user may interact with the ATM device by entering information via the physical input interface (e.g., by entering a command to begin the transaction) and/or inputting a transaction card (e.g., a debit card and/or the like) via the slot for receiving a transaction card (e.g., by inserting the transaction card, by swiping the transaction card, and/or the like) to initiate the transaction.

Additionally, or alternatively, the user may execute the application on the user device to initiate the transaction at the ATM device. For example, the user may open the application on the user device and enter information to initiate the transaction (e.g., enter a command to begin the transaction). In some implementations, the user device may receive an input that indicates a request to initiate a transaction at the ATM device.

As shown by reference number 110, the ATM device may send, and the user device may receive, a pairing request based on the user initiating the transaction at the ATM device and/or the user device. The pairing request may include an invitation for the user device to establish a wireless connection with the ATM device. In some implementations, the ATM device may include a wireless transceiver (e.g., a Bluetooth-based communication interface and/or the like) that enables the wireless transceiver to initiate wireless communications, such as to communicatively couple with the user device. Here, for example, based on the request to initiate the transaction, the ATM device may send a pairing request to the user device. In some implementations, the user may initiate the pairing request by instructing the ATM device to send the pairing request (e.g., by pressing a button on the physical input interface of the ATM device and/or pressing a button on the user device executing the application).

Figure 1B:
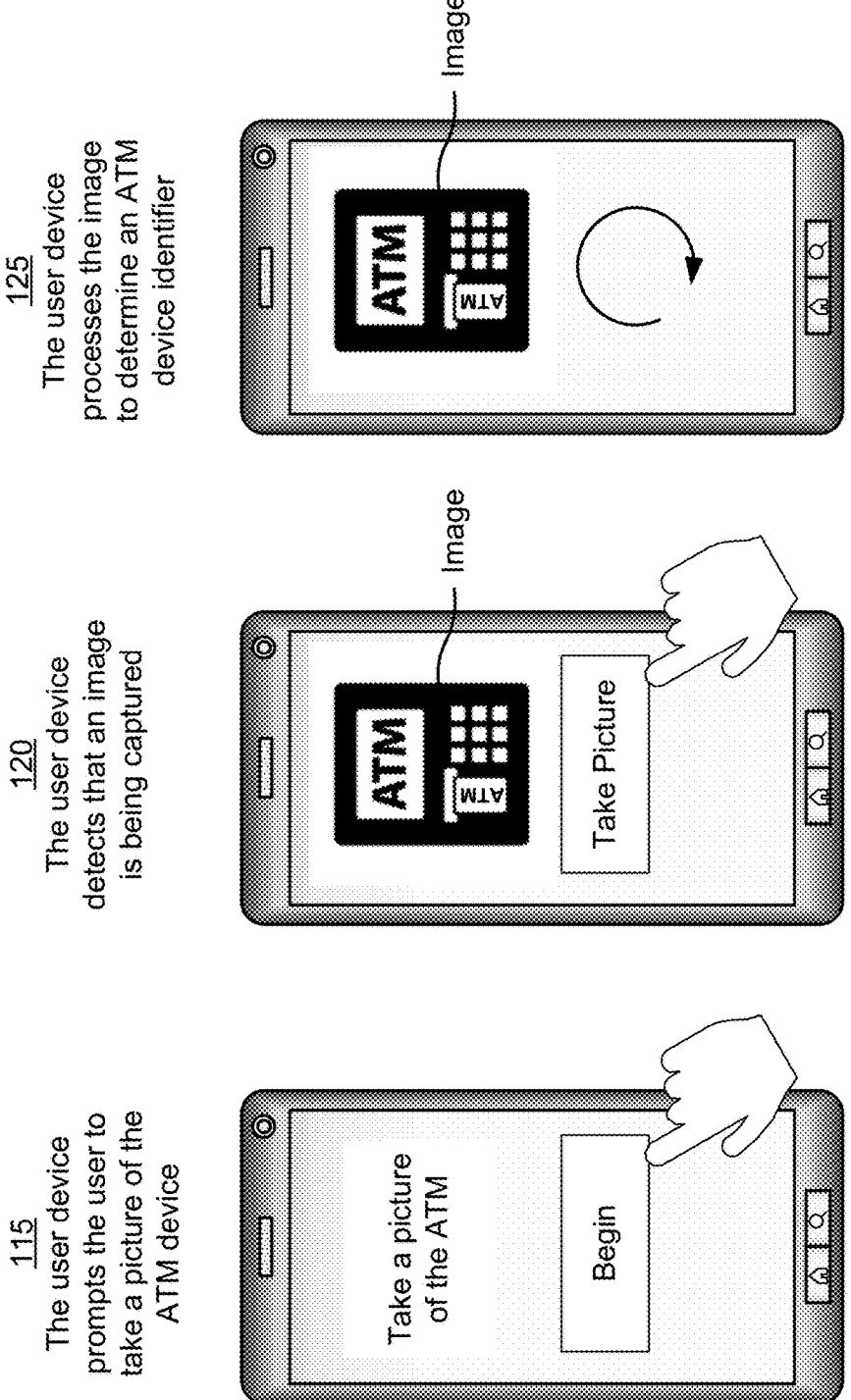

Turning now to FIG. 1B, steps may be taken to ensure that the user device interacts with the correct ATM device to facilitate the transaction. For example, the user device may capture, via the camera of the user device, an image of the ATM device to determine an ATM device identifier. In situations where there are multiple ATM devices near one another, and to avoid the possibility of a user device interacting with an unintended ATM device (e.g., an ATM device that is not directly in front of the user of the user device, an ATM device that may be fraudulent, and/or the like) and a user of the user device mistakenly conducting a transaction with the unintended ATM device, each of the ATM devices may be associated with a particular identifier (e.g., a visible identifier, such as an identification string associated with the ATM device that includes alphanumeric characters, a quick response (QR) code, a bar code, and/or the like), and may be visibly marked (e.g., on a surface of a body of the ATM device in the form of a tag, a plate, and/or the like). In this way, the user device may be able to determine if the user device is interacting with an authorized ATM device (e.g., an ATM device that is registered with, operated by, licensed by, and/or associated with a particular entity, such as a bank), thereby increasing security for the transaction by mitigating the possibility that the user's sensitive information (e.g., the PIN and/or the like) will be input into a fraudulent ATM device.

As shown by reference number 115, the user device may present an instruction for the user to capture one or more images of the ATM device. In some implementations, the user device may present the instruction for the user to capture one or more images of the ATM device based on the request to initiate the transaction. For example, in the scenario where the user initiated the transaction on the user device (e.g., by entering a command to begin the transaction in the application), the user device may present the instruction so as to determine which ATM device will facilitate the transaction. In this way, the user may avoid entering any input (e.g., the transaction card, the PIN, and/or the like) in an ATM device before the user device determines that the ATM device is authorized (e.g., an ATM device that is registered with, operated by, licensed by, and/or associated with a particular entity, such as a bank) and thereby increasing security of the ATM transaction.

In some implementations, the instruction may specify a particular feature of the ATM device for the user to capture with the camera of the user device (e.g., the front of the ATM device, the side of the ATM device, the display of the ATM device, the particular identifier of the ATM device, and/or the like). In some implementations, the instruction may specify that the user must capture multiple images of the ATM device with the camera of the user device (e.g., an image of the front of the ATM device and an image of the side of the ATM device and/or the like).

In some implementations, the user device may present the instruction for the user to capture one or more images of the ATM device based on the pairing request. For example, in the scenario where the user initiated the transaction on the ATM device (e.g., by entering information via the physical input interface and/or inputting a transaction card), the ATM device may send a pairing request to the user device and the user device may present the instruction so as to determine which ATM device sent the pairing request. In this way, the user device may be able to determine if the user device is interacting with an authorized ATM device (e.g., an ATM device that is registered with, operated by, licensed by, and/or associated with a particular entity, such as a bank), thereby increasing security for the transaction by mitigating the possibility that the user's sensitive information (e.g., the PIN and/or the like) will be input into a fraudulent ATM device.

As shown by reference number 120, the user device may determine that an image, of the one or more images of the ATM device, has been captured. In some implementations, the user may point the camera of the user device at the ATM device to capture the image of the ATM device. For example, the camera associated with the user device may be pointed at the ATM device and the display associated with the user device may display an image captured by the camera, a field of view of the camera, and/or the like.

In some implementations, the user device may detect the ATM device in the image captured by the camera and/or the field of view of the camera by using one or more computer vision techniques (e.g., a scale-invariant feature transform (SIFT) technique, a speeded up robust features (SURF) technique, an optical character recognition (OCR) technique, and/or the like). In some implementations, the user device may use the one or more computer vision techniques to detect the particular identifier of the ATM device in the image captured by the camera and/or the field of view of the camera.

As shown by reference number 125, the user device may process the image to determine the ATM device identifier (e.g., information that identifies the ATM device). In some implementations, the user device may use the one or more computer vision techniques to generate a model of the ATM device based on detecting the ATM device in the image captured by the camera and/or the field of view of the camera. In some implementations, the user device may store a plurality of models of ATM devices or have access to the stored plurality of models of ATM devices (e.g., by communicating with another device that has the stored plurality of models of ATM devices). In this case, the user device may compare the model of the ATM device and the stored plurality of models of ATM devices (e.g., by performing a lookup) to determine the ATM device identifier. For example, if the model of the ATM device matches a stored model of an ATM device, of the stored plurality of models of ATM devices, then the user device may determine that the model of the ATM device has the same ATM device identifier as the stored model of the ATM device.

In some implementations, the user device may process the image to determine general ATM identifying information (e.g., the make of the ATM device, the model of the ATM device, the manufacturer of the ATM device, and/or the like). In some implementations, the user device may present an additional instruction for the user to capture one or more additional images of the ATM device. In some implementations, the user device may present the additional instruction for the user to capture one or more additional images of the ATM device based on the general ATM identifying information. In some implementations, the additional instruction may specify a particular feature of the ATM device for the user to capture with the camera of the user device (e.g., the front of the ATM device, the side of the ATM device, the display of the ATM device, the particular identifier of the ATM device, and/or the like). In some implementations, the user device may determine that an additional image, of the one or more additional images of the ATM device, has been captured, as described elsewhere herein.

In some implementations, the user device may determine the ATM device identifier based on detecting the particular identifier of the ATM device in the image captured by the camera and/or the field of view of the camera and/or the additional image captured by the camera and/or the field of view of the camera. For example, the user device may use the one or more computer vision techniques to process the particular identifier and determine the ATM device identifier. In this way, the user device may ensure that the user device identifies the correct ATM device to facilitate the transaction.

Turning now to FIG. 1C, the user device may establish a wireless connection with the ATM device, receive additional information from the ATM device, and ask the validation device to validate the ATM device. As shown by reference number 130, in some implementations, the user device may establish a wireless connection with the ATM device. In some implementations, the user device may establish the wireless connection based on receiving the pairing request from the ATM device. For example, the user device may send an acceptance signal to the ATM device, based on the pairing request, and the user device and ATM device may communicate to establish the wireless connection.

In some implementations, the user device may establish the wireless connection based on determining the ATM device identifier. For example, the user device may send a new pairing request to the ATM device associated with the ATM identifier, and the user device and the ATM device associated with the ATM identifier may communicate to establish the wireless connection.

In some implementations, the user device may establish the wireless connection based on receiving the pairing request from the ATM device and determining the ATM device identifier. For example, the user device may compare the pairing request and the ATM device identifier to determine that the ATM device that sent the pairing request is the same as the ATM device associated with the ATM identifier. The user device then may send an acceptance signal to the ATM device, and the user device and ATM device may communicate to establish the wireless connection.

In some implementations, the user device may determine ATM wireless connection information (e.g., information that identifies the ATM device) based on the wireless connection. For example, the user device may analyze a characteristic of the wireless connection to determine the ATM wireless connection information, such as a network identification number (ID), a network address, and/or the like that identifies the ATM device.

In some implementations, the ATM device may send, and the user device may receive, additional ATM device information (e.g., information associated with the ATM device) from the ATM device via the wireless connection. For example, the ATM device information may include the ATM device identifier and/or other information, such as information concerning transaction capabilities of the ATM device, information concerning the layout and/or operation of the physical input interface, and/or the like.

As shown by reference number 135, the user device may send a validation request, which may include the ATM device identifier, the ATM wireless connection information, and/or the additional ATM device information, to the validation device. In some implementations, the validation device may determine whether the information contained in the validation request identifies an authorized ATM device (e.g., an ATM device that is registered with, operated by, licensed by, and/or associated with a particular entity, such as a bank).

As shown by reference number 140, the validation device may store information that identifies a plurality of authorized ATM devices. The validation device may compare the information contained in the validation request and the stored information that identifies the plurality of authorized ATM devices (e.g., by performing a lookup). If the information contained in the validation request matches the stored information that identifies an ATM device, of the plurality of authorized ATM devices, then the validation device may determine that the information contained in the validation request is valid. In this case, the validation device may send a signal to the user device that indicates the ATM device has been validated. In this way, the user device may ensure that the user device is connected with the correct ATM device to facilitate the transaction.

Turning now to FIG. 1D, and as shown by reference number 145, the user device may receive the signal that indicates the ATM device has been validated, and cause an AR overlay to be displayed on the user device. For example, the AR overlay may include information related to entering the PIN on the physical input interface of the ATM device (e.g., information related to authenticating the user to the ATM device).

In some implementations, the AR overlay may be displayed to overlay an image of the physical input interface of the ATM device that comprises a keypad, a numeric keyboard, an alpha-numeric keyboard, a blank keypad and/or keyboard (e.g., where each button is blank and/or has no mark or character), a touch capacitive screen, and/or the like. For example, where the user device is a smartphone, the AR overlay may be displayed on the display of the user device over an image (e.g., a real time image) of the physical input interface of the ATM device captured by the camera of the user device. In some implementations, the AR overlay may be displayed to overlay the physical input interface of the ATM device that comprises a keypad, a numeric keyboard, an alpha-numeric keyboard, a touch capacitive screen, and/or the like. For example, where the user device is a pair of smart eyeglasses, the AR overlay may be displayed (e.g., projected on a lens of the smart eyeglasses and/or the like) on the user device in a manner that appears, to the user, to be over the physical input interface of the ATM device.

In some implementations, the AR overlay is displayed to present buttons of varying sizes, of varying shapes, and/or at varying locations. For example, the AR overlay may be displayed to present the numbers for entering the PIN on buttons that have different sizes and locations on a touch capacitive screen. The size and location of the buttons may be different for each user, each transaction, each user device, each ATM device, and/or the like. In this way, each user may interact with the ATM device in a different way (e.g., the AR overlay may appear on one portion of the ATM display for a first user and the AR overlay may appear on a different portion of the ATM display for a second user) that is indecipherable to an outside observer, thereby increasing the security of the transaction. Further, an ATM device manufacturer can install one type of touch capacitive screen in the ATM device that can be used for any type of transaction, instead of having to install customized keypads or keyboards, thus reducing manufacturing costs associated with making the ATM device.

In some implementations, the AR overlay may be displayed to present characters and/or symbols in a random layout. For example, the AR overlay may be displayed to present characters and/or symbols in a random layout, where each character and/or symbol appears to be on a button of a blank key pad. In another example, the ATM device may include a keypad that includes number keys (e.g., 0 through 9) arranged in numerical order (e.g., such that the number 1 key is in the top left corner, the number 9 key is in the lower right corner, etc.) and the AR overlay may present the number keys in a random layout (e.g., such that the number 5 key is in the top left corner, the number 2 key is in the lower right corner, etc.). The user may interact with the keypad according to the random layout of keys presented in the AR overlay to enter a code (e.g., if the user's PIN is 5555, the user pushes the top left key, the number 1 key on the keypad, four times). The ATM device may then translate the code according to the random layout presented in the AR overlay and determine if the code matches the user's PIN (e.g., if the code represents 1111, the ATM device translates the code to 5555). The ATM may communicate with the validation device, the user device, and/or another device to translate the code and/or determine if the code matches the user's PIN. If the code matches the user's PIN, the ATM device authenticates the user and commences the transaction. In this way, the user device, via the AR overlay, ensures that input by the user into the input interface of the ATM device may not be easily observed by a bad actor.

As shown by reference number 150, the user device may determine whether a user action is performed at the ATM device. In some implementations, the user device may determine whether a user action is performed with respect to the information related to entering the PIN on the physical input interface of the ATM device. For example, the user device may monitor, via the camera of the user device, the physical input interface of the ATM device and determine, using one or more computer vision techniques, whether the user has entered the PIN. In some implementations, the user device may determine whether the user has entered the PIN by recognizing whether the user has pushed one or more buttons on the physical input interface (e.g., by determining if the user's finger hovered over the one or more buttons for a threshold period of time, by determining if the user's finger contacted the one or more buttons, and/or the like).

In some implementations, the user device may receive from the ATM device, through the wireless connection, information concerning whether the user action is performed. For example, after the user enters the PIN on the input interface, the ATM device may send information indicating that the user entered the PIN (e.g., information concerning whether the user action is performed) to the user device. The user device may receive the information indicating that the user entered the PIN and then determine that the user action has been performed.

In some implementations, the user device may establish a wireless connection with the ATM device (e.g., if a wireless connection has not already been established) and receive from the ATM device, through the wireless connection, the information concerning whether the user action is performed. For example, after the user enters the PIN on the input interface, the ATM device may send the information indicating that the user entered the PIN to the user device. The user device may receive the information indicating that the user entered the PIN and then determine that the user action has been performed.

As shown by reference number 155, the user device may perform a device action after determining whether the user action is performed. In some implementations, the device action may be related to the information related to entering the PIN on the physical input interface of the ATM device, the ATM device, or the AR overlay. For example, the user device, after determining that the user action has been performed, may cause a supplemental AR overlay to be displayed that includes: a translation of text, provided on a display of the ATM device, to a different language; a message indicating that the user is authorized to perform the transaction; and/or an additional instruction related to the transaction. Additionally, or alternatively, the user device, after determining that the user action has been performed, may cause the AR overlay to cease and/or stop being displayed.

As indicated above, FIGS. 1A-1D are provided merely as an example. Other examples are possible and may differ from what was described with regard to FIGS. 1A-1D.

Figure 2:
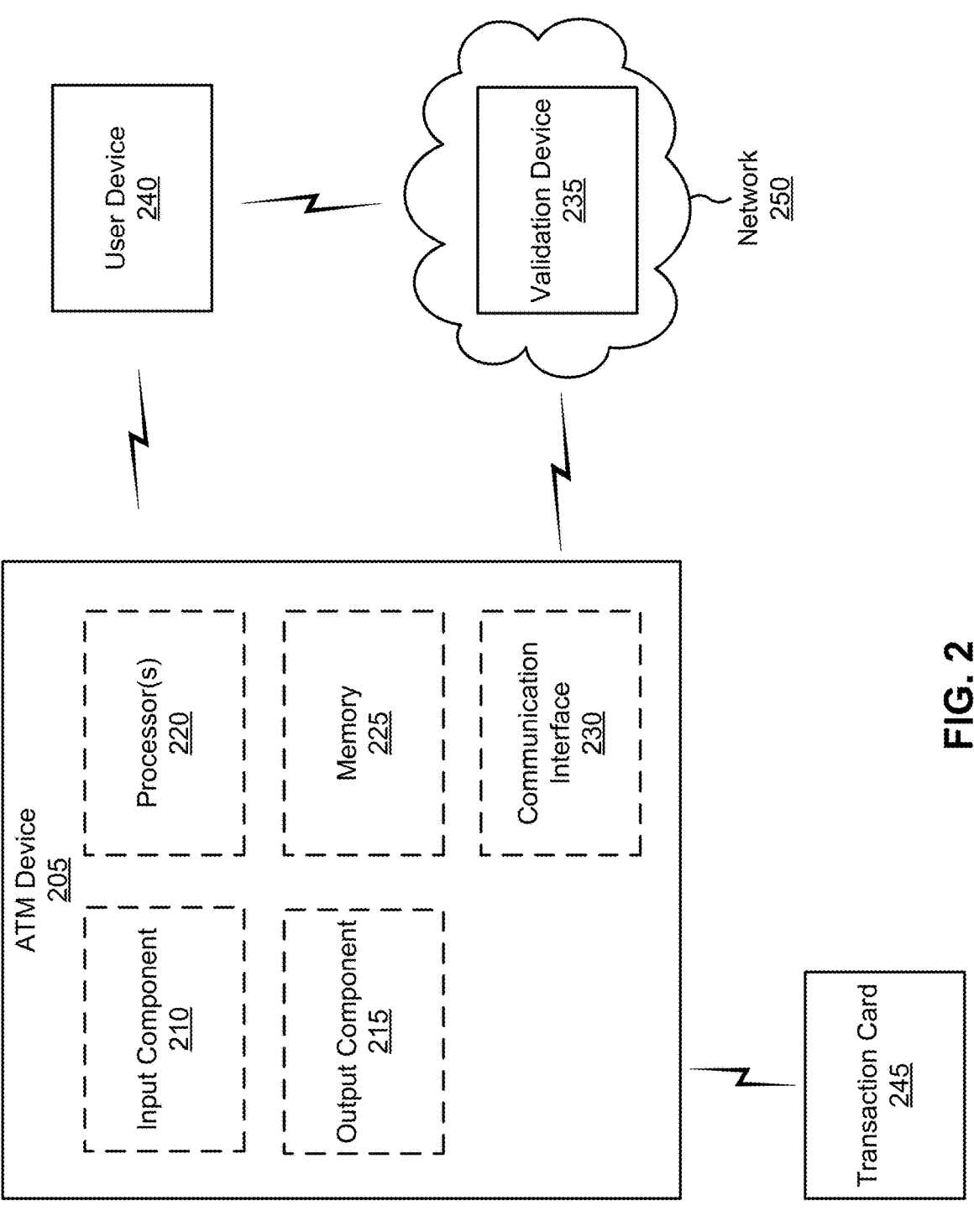
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an ATM device 205, which may include an input component 210, an output component 215, one or more processors 220, one or more memories 225, and/or a communication interface 230. As further shown, environment 200 may include a validation device 235, a user device 240, a transaction card 245, and/or a network 250. Devices and/or components of environment 200 may interconnect via wired connections, wireless connections, or a combination of wired and wireless connections.

ATM device 205 includes one or more devices capable of performing various types of financial transactions, such as a cash withdrawal, a money deposit (e.g., a check or cash deposit), a money transfer (e.g., a transfer from one bank account to another bank account), access to information related to an account (e.g., a bank account, a checking account, a credit account, etc.), and/or the like. For example, ATM device 205 may include an ATM, an automated banking machine (ABM), a cash point, a Cashline®, a Minibank®, a cash machine, a Tyme® machine, a cash dispenser, a Bankomat®, a Bancomat®, and/or a similar type of device. In some implementations, ATM device 205 may receive a user input (e.g., a PIN, account information, and/or the like), and may determine whether to provide access to an account (e.g., to perform one or more actions associated with the account) based on the user input, as described elsewhere herein. While an ATM device 205 is used as an example, the techniques described herein may be performed to permit or deny access using another type of resource, such as a computer, a security door, a turnstile, and/or the like.

Input component 210 includes one or more devices (e.g., the physical input interface) capable of being used to provide the user input to ATM device 205. For example, input component 210 may include one or more mechanical buttons, one or more electronic buttons, one or more sensors, a keypad (e.g., a mechanical keypad, an electronic keypad, and/or the like), a number pad (e.g., a mechanical number pad, an electronic number pad, and/or the like), a PIN pad (e.g., a mechanical PIN pad, an electronic PIN pad, and/or the like), a touch screen, and/or the like. In some implementations, input component 210 may include one or more mechanical buttons and one or more sensors to detect a mechanical force with which the one or more mechanical buttons are pressed. In some implementations, input component 210 may include one or more electronic buttons and one or more sensors to detect a surface area covered when the one or more electronic buttons are pressed. In this case, a larger surface area may indicate that the electronic button is being pushed with more force, a smaller surface area may indicate that the electronic button is being pushed with less force, and/or the like. Additionally, or alternatively, input component 210 may include one or more mechanical or electronic buttons and one or more sensors to determine an amount of time that a mechanical or electronic button, of the one or more mechanical or electronic buttons, is pressed.

Output component 215 includes one or more devices capable of being used to output information from ATM device 205. For example, output component 215 may include a display, a speaker, an indicator light (e.g., a light-emitting diode and/or the like), a vibrating component, and/or the like. In some implementations, output component 215 may output an indication that ATM device 205 has received the user input. Additionally, or alternatively, output component 215 may output an indication of whether the user input is valid or invalid. Additionally, or alternatively, output component 215 may output information associated with an action to be performed in connection with an account.

Processor 220 includes one or more types of processing components capable of being programmed to perform a function, such as one or more operations described elsewhere herein. In some implementations, processor 220 may correspond to a processor described in more detail below in connection with FIG. 3.

Memory 225 includes one or more types of memories capable of storing information. In some implementations, memory 225 may store information (e.g., a set of parameters corresponding to user input and/or the like) associated with performing one or more operations described elsewhere herein. In some implementations, memory 225 may correspond to a memory described in more detail below in connection with FIG. 3.

Communication interface 230 includes one or more types of communication interfaces that allow ATM device 205 to communicate with other devices (e.g., validation device 235, user device 240, transaction card 245, and/or the like), such as via a wired connection, a wireless connection, or a combination of wired and wireless connections. For example, communication interface 230 may be used to read information from transaction card 245, to transmit information to or receive information from user device 240 (e.g., information associated with establishing a wireless connection, transaction-related information, etc.), and/or the like. In some implementations, communication interface 230 may correspond to a communication interface described in more detail below in connection with FIG. 3.

Validation device 235 includes one or more devices capable of validating ATM devices 205. For example, validation device 235 may include a server, a cloud computing device, a transaction backend, or another type of computing device. In some implementations, validation device 235 may store a set of parameters associated with a plurality of authorized ATM devices, which may be configured and/or stored by communicating with ATM device 205, user device 240, and/or the like. Additionally, or alternatively, validation device 235 may receive a set of parameters associated with validating an ATM device 205, may compare the received parameter(s) to stored parameter(s), and may determine whether the ATM device 205 is valid based on the comparison. In some implementations, validation device 235 may transmit (e.g., to user device 240) an indication of whether the ATM device 205 is valid.

User device 240 includes one or more devices capable of receiving, generating, storing, processing, and/or providing information associated with configuring an augmented reality overlay. For example, user device 240 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 240 may detect, within a field of view of a camera associated with user device 240, the ATM device 205, as described elsewhere herein. Additionally, or alternatively, user device 240 may provide, for display, an AR overlay related to a user entering input at the physical input interface of the ATM device 205, as described elsewhere herein.

Transaction card 245 includes a transaction card that can be used to complete a transaction and/or access account information. For example, transaction card 245 may include a credit card, a debit card, an ATM card, a stored-value card, a fleet card, a transit card, an access card, a virtual card implemented on user device 240, and/or the like. Transaction card 245 may be capable of storing and/or communicating data for a point-of-sale (PoS) transaction and/or an ATM transaction. For example, transaction card 245 may store and/or communicate data, including account information (e.g., an account identifier, a cardholder identifier, etc.), expiration information of transaction card 245 (e.g., information identifying an expiration month and/or year of transaction card 245), banking information (e.g., a routing number of a bank, a bank identifier, etc.), transaction information (e.g., a payment token), and/or the like. For example, to store and/or communicate the data, transaction card 245 may include a magnetic strip and/or an integrated circuit (IC) chip (e.g., a EUROPAY®, MASTERCARD®, or VISA® (EMV) chip). Additionally, or alternatively, transaction card 245 may include an antenna to communicate data associated with transaction card 245. The antenna may be a passive radio frequency (RF) antenna, an active RF antenna, and/or a battery-assisted RF antenna. In some implementations, transaction card 245 may be a smart transaction card, capable of communicating wirelessly (e.g., via Bluetooth, Bluetooth Low Energy (BLE), near-field communication (NFC), and/or the like) with ATM device 205.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
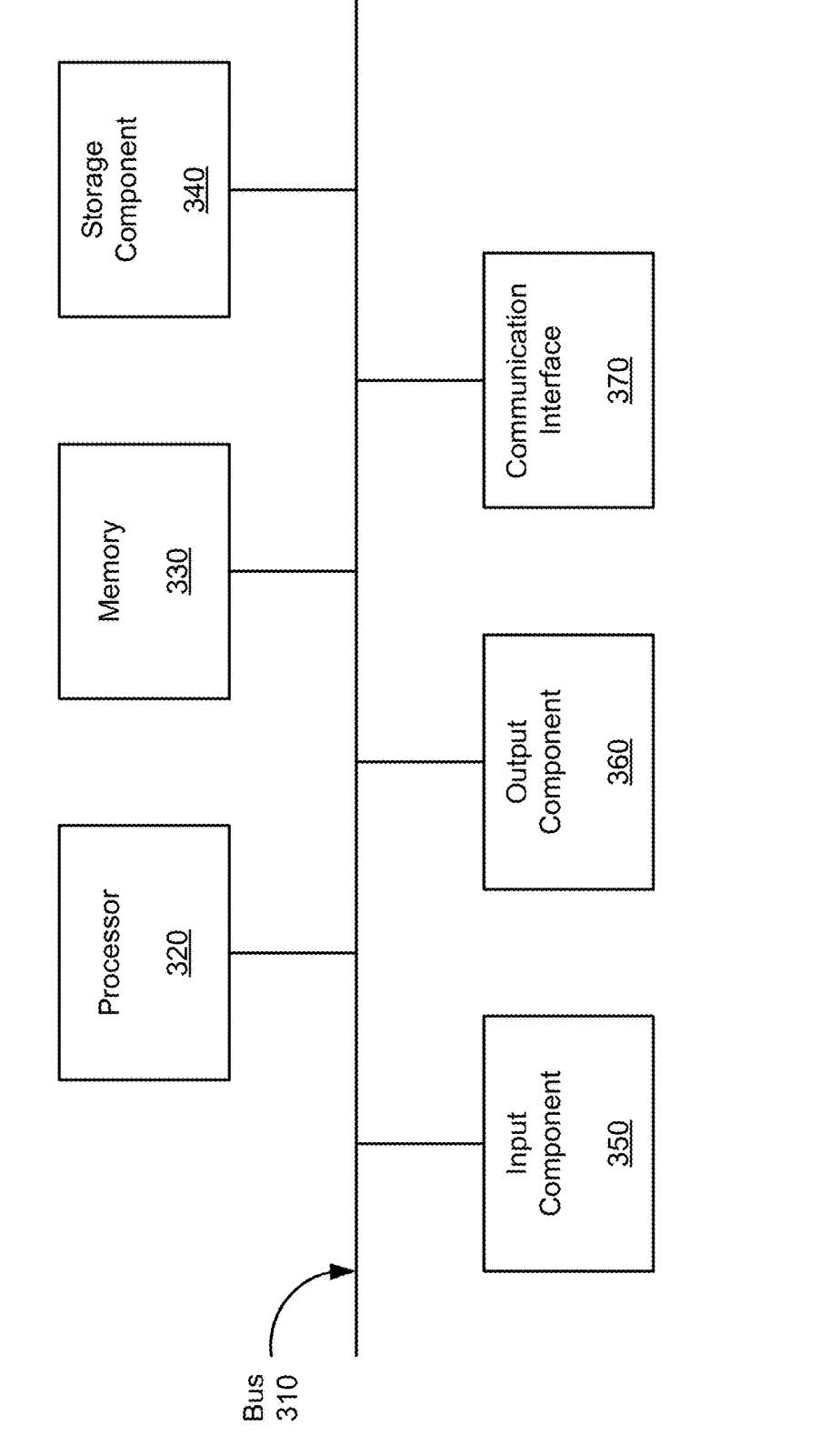
FIG. 3 is a diagram of example components of one or more devices of FIG. 2.

FIG. 3 is a diagram of example components of a device 300. Device 300 may correspond to ATM device 205, validation device 235, user device 240, and/or transaction card 245. In some implementations, ATM device 205, validation device 235, user device 240, and/or transaction card 245 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory

330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing an augmented reality overlay to secure input data. In some implementations, one or more process blocks of FIG. 4 may be performed by a user device (e.g., user device 240). In some implementations, one or more process blocks of FIG. 4 may be performed by another device or a group of devices separate from or including the user device (e.g., user device 240), such as an ATM device (e.g., ATM device 205) and a validation device (e.g., validation device 235).

As shown in FIG. 4, process 400 may include receiving an input that indicates a request to initiate a transaction at an automated teller machine (ATM) device (block 405). For example, the user device (e.g., using processor 320, memory 330, storage component 340, input component 350, communication interface 370, and/or the like) may receive an input that indicates a request to initiate a transaction at an ATM device, as described above in connection with FIGS. 1A-1D.

As further shown in FIG. 4, process 400 may include causing to be presented, based on the request to initiate the transaction, an instruction for a user to capture one or more images of the ATM device (block 410). For example, the user device (e.g., using processor 320, memory 330, storage component 340, output component 360, communication interface 370, and/or the like) may cause to be presented, based on the request to initiate the transaction, an instruction for a user to capture one or more images of the ATM device, as described above in connection with FIGS. 1A-1D.

As further shown in FIG. 4, process 400 may include determining that an image of one or more images of the ATM device has been captured (block 415). For example, the user device (e.g., using processor 320, memory 330, storage component 340, and/or the like) may determine that an image of one or more images of the ATM device has been captured, as described above in connection with FIGS. 1A-1D.

As further shown in FIG. 4, process 400 may include processing the image, of one or more images, to determine first information that identifies the ATM device (block 420). For example, the user device (e.g., using processor 320, memory 330, storage component 340, and/or the like) may process the image, of one or more images, to determine first information that identifies the ATM device, as described above in connection with FIGS. 1A-1D. In some implementations, the first information may refer to the ATM device identifier, as described above in connection with FIGS. 1A-1D.

As further shown in FIG. 4, process 400 may include sending the first information that identifies the ATM device to a server device to permit the server device to validate the ATM device (block 425). For example, the user device (e.g., using processor 320, memory 330, storage component 340, output component 360, communication interface 370, and/or the like) may send the first information that identifies the ATM device to a server device to permit the server device to validate the ATM device, as described above in connection with FIGS. 1A-1D.

As further shown in FIG. 4, process 400 may include receiving, from the server device and based on sending the first information that identifies the ATM to the server device, a signal that indicates the ATM device has been validated (block 430). For example, the user device (e.g., using processor 320, memory 330, storage component 340, input component 350, communication interface 370, and/or the like) may receive, from the server device and based on sending the first information that identifies the ATM to the server device, a signal that indicates the ATM device has been validated, as described above in connection with FIGS. 1A-1D.

As further shown in FIG. 4, process 400 may include causing an augmented reality (AR) overlay to be displayed after receiving the signal that indicates the ATM device has been validated (block 435). For example, the user device (e.g., using processor 320, memory 330, storage component 340, output component 360, communication interface 370, and/or the like) may cause an augmented reality (AR) overlay to be displayed after receiving the signal that indicates the ATM device has been validated, as described above in connection with FIGS. 1A-1D. In some implementations, the AR overlay may include second information related to authenticating the user to the ATM device. In some implementations, the second information may refer to the information related to entering the PIN on the physical input interface of the ATM device, as described above in connection with FIGS. 1A-1D.

As further shown in FIG. 4, process 400 may include determining whether a user action is performed with respect to the second information included in the AR overlay after causing the AR overlay to be displayed (block 440). For example, the user device (e.g., using processor 320, memory 330, storage component 340, and/or the like) may determine whether a user action is performed with respect to the second information included in the AR overlay after causing the AR overlay to be displayed, as described above in connection with FIGS. 1A-1D.

As further shown in FIG. 4, process 400 may include performing a device action related to the second information, the ATM device, or the AR overlay after determining whether the user action is performed with respect to the second information included in the AR overlay (block 445). For example, the user device (e.g., using processor 320, memory 330, storage component 340, input component 350, output component 360, communication interface 370, and/or the like) may perform a device action related to the second information, the ATM device, or the AR overlay after determining whether the user action is performed with respect to the second information included in the AR overlay, as described above in connection with FIGS. 1A-1D.

Process 400 may include additional implementations, such as any single implementation or any combination of implementations described below and/or in connection with one or more other processes described elsewhere herein.

In some implementations, when processing the image to determine the first information that identifies the ATM device, process 400 may determine the first information that identifies the ATM device based on a visible identifier included in the image of one or more images. In some implementations, the visible identifier may include a quick response (QR) code, bar code, or identification string associated with the ATM device.

In some implementations, the AR overlay may be displayed to overlay an image of a physical input interface of the ATM device that comprises a numeric keyboard or an alpha-numeric keyboard. In some implementations, the AR overlay may be displayed to present characters, on the image of the physical input interface, in a random layout.

In some implementations, when determining whether the user action is performed with respect to the second information included in the AR overlay, process 400 may establish a wireless connection with the ATM device, receive from the ATM device, through the wireless connection, third information concerning whether the user action is performed with respect to the second information included in the AR overlay, and determine whether the user action is performed with respect to the second information included in the AR overlay based on the third information. In some implementations, the third information may refer to the information indicating that the user entered the PIN, as described above in connection with FIGS. 1A-1D.

In some implementations, when performing the device action related to the second information, the ATM device, or the AR overlay, process 400 may cause a supplemental AR overlay to be displayed that includes a translation of text, provided on a display of the ATM device, to a different language. In some implementations, when performing the device action related to the second information, the ATM device, or the AR overlay, process 400 may cause the AR overlay to cease being displayed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for providing an augmented reality overlay to secure input data. In some implementations, one or more process blocks of FIG. 5 may be performed by a user device (e.g., user device 240). In some implementations, one or more process blocks of FIG. 5 may be performed by another device or a group of devices separate from or including the user device (e.g., user device 240), such as an ATM device (e.g., ATM device 205) and a validation device (e.g., validation device 235).

As shown in FIG. 5, process 500 may include receiving a pairing request from an automated teller machine (ATM) device based on a user initiating a transaction at the ATM device (block 505). For example, the user device (e.g., using processor 320, memory 330, storage component 340, input component 350, communication interface 370, and/or the like) may receive a pairing request from an ATM device based on a user initiating a transaction at the ATM device, as described above in connection with FIGS. 1A-1D.

As further shown in FIG. 5, process 500 may include establishing a wireless connection with the ATM device based on the pairing request (block 510). For example, the user device (e.g., using processor 320, memory 330, storage component 340, input component 350, output component 360, communication interface 370, and/or the like) may establish a wireless connection with the ATM device based on the pairing request, as described above in connection with FIGS. 1A-1D.

As further shown in FIG. 5, process 500 may include determining, based on the wireless connection, first information that identifies the ATM device (block 515). For example, the user device (e.g., using processor 320, memory 330, storage component 340, and/or the like) may determine, based on the wireless connection, first information that identifies the ATM device, as described above in connection with FIGS. 1A-1D. In some implementations, the first information may refer to the ATM wireless connection information, as described above in connection with FIGS. 1A-1D.

As further shown in FIG. 5, process 500 may include sending the first information that identifies the ATM device to a server device to permit the server device to validate the ATM device (block 520). For example, the user device (e.g., using processor 320, memory 330, storage component 340, output component 360, communication interface 370, and/or the like) may send the first information that identifies the ATM device to a server device to permit the server device to validate the ATM device, as described above in connection with FIGS. 1A-1D.

As further shown in FIG. 5, process 500 may include receiving, from the server device and based on sending the first information that identifies the ATM to the server device, a signal that indicates the ATM device has been validated (block 525). For example, the user device (e.g., using processor 320, memory 330, storage component 340, input component 350, communication interface 370, and/or the like) may receive, from the server device and based on sending the first information that identifies the ATM to the server device, a signal that indicates the ATM device has been validated, as described above in connection with FIGS. 1A-1D.

As further shown in FIG. 5, process 500 may include causing an augmented reality (AR) overlay to be displayed after receiving the signal that indicates the ATM device has been validated (block 530). For example, the user device (e.g., using processor 320, memory 330, storage component 340, output component 360, communication interface 370, and/or the like) may cause an augmented reality (AR) overlay to be displayed after receiving the signal that indicates the ATM device has been validated, as described above in connection with FIGS. 1A-1D. In some implementations, the AR overlay may include second information related to authenticating the user to the ATM device. In some implementations, the second information may refer to the information related to entering the PIN on the physical input interface of the ATM device, as described above in connection with FIGS. 1A-1D.

As further shown in FIG. 5, process 500 may include determining whether a user action is performed with respect to the second information included in the AR overlay after causing the AR overlay to be displayed (block 535). For example, the user device (e.g., using processor 320, memory 330, storage component 340, input component 350, communication interface 370, and/or the like) may determine whether a user action is performed with respect to the second information included in the AR overlay after causing the AR overlay to be displayed, as described above in connection with FIGS. 1A-1D.

As further shown in FIG. 5, process 500 may include performing a device action related to the second information, the ATM device, or the AR overlay after determining whether the user action is performed with respect to the second information included in the AR overlay (block 540). For example, the user device (e.g., using processor 320, memory 330, storage component 340, input component 350, output component 360, communication interface 370, and/or the like) may perform a device action related to the second information, the ATM device, or the AR overlay after determining whether the user action is performed with respect to the second information included in the AR overlay, as described above in connection with FIGS. 1A-1D.

Process 500 may include additional implementations, such as any single implementation or any combination of implementations described below and/or in connection with one or more other processes described elsewhere herein.

In some implementations, the AR overlay may be displayed to overlay an image of a physical input interface of the ATM device that comprises a touch capacitive screen. In some implementations, the AR overlay may be displayed to present buttons, on the image of the physical input interface, of varying sizes, of varying shapes, or at varying locations.

In some implementations, when determining whether the user action is performed with respect to the second information included in the AR overlay, process 500 may receive, from the ATM device and through the wireless connection, third information concerning whether the user action is performed with respect to the second information included in the AR overlay, and may determine whether the user action is performed with respect to the second information included in the AR overlay based on the third information. In some implementations, the third information may refer to the information indicating that the user entered the PIN, as described above in connection with FIGS. 1A-1D.

In some implementations, when performing the device action related to the second information, the ATM device, or the AR overlay, process 500 may cause the one or more processors to cause a supplemental AR overlay to be displayed that includes additional instructions related to the transaction. In some implementations, when performing the device action related to the second information, the ATM device, or the AR overlay, process 500 may cause the AR overlay to stop being displayed.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for providing an augmented reality overlay to secure input data. In some implementations, one or more process blocks of FIG. 6 may be performed by a user device (e.g., user device 240). In some implementations, one or more process blocks of FIG. 6 may be performed by another device or a group of devices separate from or including the user device (e.g., user device 240), such as an ATM device (e.g., ATM device 205) and a validation device (e.g., validation device 235).

As shown in FIG. 6, process 600 may include receiving a pairing request from an automated teller machine (ATM) device based on a user initiating a transaction at the ATM device (block 605). For example, the user device (e.g., using processor 320, memory 330, storage component 340, input component 350, communication interface 370, and/or the like) may receive a pairing request from an automated teller machine (ATM) device based on a user initiating a transaction at the ATM device, as described above in connection with FIGS. 1A-1D.

As further shown in FIG. 6, process 600 may include presenting, based on the pairing request, an instruction for the user to capture one or more images of the ATM device (block 610). For example, the user device (e.g., using processor 320, memory 330, storage component 340, input component 350, output component 360, communication interface 370, and/or the like) may present, based on the pairing request, an instruction for the user to capture one or more images of the ATM device, as described above in connection with FIGS. 1A-1D.

As further shown in FIG. 6, process 600 may include determining that an image, of the one or more images of the ATM device, has been captured (block 615). For example, the user device (e.g., using processor 320, memory 330, storage component 340, input component 350, communication interface 370, and/or the like) may determine that an image, of the one or more images of the ATM device, has been captured, as described above in connection with FIGS. 1A-1D.

As further shown in FIG. 6, process 600 may include processing the image to determine first information that identifies the ATM device (block 620). For example, the user device (e.g., using processor 320, memory 330, storage component 340, and/or the like) may process the image to determine first information that identifies the ATM device, as described above in connection with FIGS. 1A-1D. In some implementations, the first information may refer to the ATM device identifier, as described above in connection with FIGS. 1A-1D.

As further shown in FIG. 6, process 600 may include establishing a wireless connection with the ATM device based on the pairing request and the first information (block 625). For example, the user device (e.g., using processor 320, memory 330, storage component 340, input component 350, output component 360, communication interface 370, and/or the like) may establish a wireless connection with the ATM device based on the pairing request and the first information, as described above in connection with FIGS. 1A-1D.

As further shown in FIG. 6, process 600 may include receiving second information associated with the ATM device from the ATM device via the wireless connection (block 630). For example, the user device (e.g., using processor 320, memory 330, storage component 340, input component 350, communication interface 370, and/or the like) may receive second information associated with the ATM device from the ATM device via the wireless connection, as described above in connection with FIGS. 1A-1D. In some implementations, the second information may refer to the additional ATM device information, as described above in connection with FIGS. 1A-1D.

As further shown in FIG. 6, process 600 may include sending the first information that identifies the ATM device and the second information associated with the ATM device to a server device to permit the server device to validate the ATM device (block 635). For example, the user device (e.g., using processor 320, memory 330, storage component 340, output component 360, communication interface 370, and/or the like) may send the first information that identifies the ATM device and the second information associated with the ATM device to a server device to permit the server device to validate the ATM device, as described above in connection with FIGS. 1A-1D.

As further shown in FIG. 6, process 600 may include receiving, from the server device, and based on sending the first information that identifies the ATM and the second information associated with the ATM device to the server device, a signal that indicates the ATM device has been validated (block 640). For example, the user device (e.g., using processor 320, memory 330, storage component 340, input component 350, communication interface 370, and/or the like) may receive, from the server device, and based on sending the first information that identifies the ATM and the second information associated with the ATM device to the server device, a signal that indicates the ATM device has been validated, as described above in connection with FIGS. 1A-1D.

As further shown in FIG. 6, process 600 may include causing an augmented reality (AR) overlay to be displayed after receiving the signal that indicates the ATM device has been validated (block 645). For example, the user device (e.g., using processor 320, memory 330, storage component 340, output component 360, communication interface 370, and/or the like) may cause an augmented reality (AR) overlay to be displayed after receiving the signal that indicates the ATM device has been validated, as described above in connection with FIGS. 1A-1D. In some implementations, the AR overlay may include third information related to authenticating the user to the ATM device. In some implementations, the third information may refer to the information related to entering the PIN on the physical input interface of the ATM device, as described above in connection with FIGS. 1A-1D.

As further shown in FIG. 6, process 600 may include determining whether a user action is performed with respect to the third information included in the AR overlay after causing the AR overlay to be displayed (block 650). For example, the user device (e.g., using processor 320, memory 330, storage component 340, and/or the like) may determine whether a user action is performed with respect to the third information included in the AR overlay after causing the AR overlay to be displayed, as described above in connection with FIGS. 1A-1D.

As further shown in FIG. 6, process 600 may include performing a device action related to the third information included in the AR overlay, the ATM device, or the AR overlay after determining whether the user action is performed with respect to the third information included in the AR overlay (block 655). For example, the user device (e.g., using processor 320, memory 330, storage component 340, input component 350, output component 360, communication interface 370, and/or the like) may perform a device action related to the third information included in the AR overlay, the ATM device, or the AR overlay after determining whether the user action is performed with respect to the third information included in the AR overlay, as described above in connection with FIGS. 1A-1D.

Process 600 may include additional implementations, such as any single implementation or any combination of implementations described below and/or in connection with one or more other processes described elsewhere herein.

In some implementations, when processing the image to determine the first information that identifies the ATM device, process 600 may include determining the first information that identifies the ATM device based on a quick response (QR) code, bar code, and/or identification string that is visible in the image. In some implementations, the AR overlay may be displayed to overlay a touch capacitive screen of the ATM device. In some implementations, the AR overlay may be displayed to overlay a keyboard or keypad of the ATM device.

In some implementations, when determining whether the user action is performed with respect to the third information included in the AR overlay, process 600 may include receiving, from the ATM device and via the wireless connection, fourth information concerning whether the user action is performed with respect to the third information included in the AR overlay, and determining whether the user action is performed with respect to the third information included in the AR overlay based on the fourth information. In some implementations, the fourth information may refer to the information indicating that the user entered the PIN, as described above in connection with FIGS. 1A-1D.

In some implementations, when performing the device action related to the third information, the ATM device, or the AR overlay, process 600 may include causing a supplemental AR overlay to be displayed that includes a message indicating that the user is authorized to perform the transaction. In some implementations, when performing the device action related to the third information, the ATM device, or the AR overlay, process 600 may include causing the AR overlay to stop being displayed after the user is authorized to perform the transaction.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein, describe using a camera of the user device to capture an image of the ATM device and communicating with the validation device to validate the ATM device. In this way, some implementations decrease the chance of the user device connecting to an incorrect ATM device. This mitigates the ability of bad actors to spoof an ATM device and gain access to the AR overlay information displayed on the user device.

In some implementations, the AR overlay presents characters and/or symbols in a random order on physical input interface of the ATM device, where the AR overlay is visible to only the user via the user device. This allows the user to securely enter account sensitive information (e.g., a PIN, account information, a transaction amount, and/or the like) without spies being able to determine the content of the sensitive information. Even if a spy uses a transaction card skimmer and a camera that records the physical input interface of ATM device, the information entered by the user will be indecipherable because the spy will not know the keypad layout in the AR overlay displayed on user device. Additionally, other user authorization components of an ATM device do not need to be utilized (e.g., a camera, biometric sensor, and/or the like), thus simplifying design of ATM devices and reducing wear and tear on ATM devices that utilize the authorization components.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more memory devices; and
one or more processors, coupled to the one or more memory devices, configured to:
determine, based on capturing an image of a second device via a camera of the first device, identifying information associated with the second device;

establish, by the first device and based on the identifying information, a communication session with the second device;

cause, based on establishing the communication session, an augmented reality (AR) overlay to be implemented and displayed on the first device, the AR overlay being displayed on the first device to overlay an image of a screen associated with an input interface of the second device, the AR overlay including second information related to authenticating a user of the first device with the second device, and the AR overlay displaying one or more input elements of at least one of varying sizes, varying shapes, or at varying locations of the input interface of the second device;

determine, by the first device, that the input interface of the second device received an input from the user, wherein the determination is based on at least one of:

monitoring the input interface of the second device via the camera of the first device using one or more computer vision techniques, or receiving, by the first device and from the second device, information related to the input via a wireless communication connection between the first device and the second device; and perform, by the first device and based on determining whether an interaction occurred with the input interface of the second device, an action displaying supplemental information related to at least one of the second information, the AR overlay, or the second device.

2. The first device of claim 1, wherein the AR overlay is displayed to present the one or more input elements in a random layout.

3. The first device of claim 1, wherein the one or more input elements are different for at least one of:

different users, different transactions, or different devices.

4. The first device of claim 1, wherein the one or more processors are configured to:

cause translation of information associated with the interaction with the input interface of the second device; and cause verification of information associated with the translation of information.

5. The first device of claim 1, wherein the one or more processors are configured to:

cause translation of information associated with the interaction with the input interface of the second device, the interaction with the input interface of the second device being based on a random layout of the one or more input elements displayed by the AR overlay, and the random layout of the one or more input elements being different from a layout of the input interface of the second device; and cause verification of information associated with the translation of information.

6. The first device of claim 1, wherein the input interface of the second device is a keypad or a touch capacitive screen.

7. The first device of claim 1, wherein the one or more processors, to perform the action, are configured to:

authorize a transaction with the second device based on information indicating the interaction and the second information.

8. A method, comprising:

determining, by a first device and based on capturing an image of a second device via a camera of the first device, identifying information associated with the second device;

establishing, by the first device and based on the identifying information, a communication session with the second device;

causing, by the first device and based on establishing the communication session, an augmented reality (AR) overlay to be implemented and displayed on the first device, the AR overlay being displayed on the first device to overlay an image of a screen associated with an input interface of the second device, the AR overlay including second information related to authenticating a user of the first device with second device, and the AR overlay displaying one or more input elements of at least one of varying sizes, varying shapes, or at varying locations of the input interface of the second device;

determining, by the first device, that the input interface of the second device received an input from the user, wherein the determination is based on at least one of:

monitoring the input interface of the second device via the camera of the first device using one or more computer vision techniques, or receiving, by the first device and from the second device, information related to the input via a wireless communication connection between the first device and the second device; and performing, by the first device, based on determining whether an interaction occurred with the input interface of the second device, an action displaying supplemental information related to at least one of the second information, the AR overlay, or the second device.

9. The method of claim 8, wherein the AR overlay is displayed to present the one or more input elements in a random layout.

10. The method of claim 8, wherein the one or more input elements are different for at least one of:

different users, different transactions, or different devices.

11. The method of claim 8, further comprising:

causing translation of information associated with the interaction with the input interface of the second device; and causing verification of information associated with the translation of information.

12. The method of claim 8, further comprising:

causing translation of information associated with the interaction with the input interface of the second device, the interaction with the input interface of the second device being based on a random layout of the one or more input elements displayed by the AR overlay, and the random layout of the one or more input elements being different from a layout of the input interface of the second device; and causing verification of information associated with the translation of information.

13. The method of claim 8, wherein the input interface of the second device is a keypad or a touch capacitive screen.

14. The method of claim 8, wherein performing the action comprises:

authorizing a transaction with the second device based on information indicating the interaction and the second information.

15. A non-transitory computer-readable medium storing a set of instructions, the set of instructions comprising:

one or more instructions that, when executed by one or more processors of a first device, cause the first device to:

determine, based on capturing an image of a second device via a camera of the first device, identifying information of the second device;

establish, by the first device and based on the identifying information, a communication session with the second device;

cause, based on establishing the communication session, an augmented reality (AR) overlay to be implemented and displayed on the first device, the AR overlay being displayed on the first device to overlay an image of a screen associated with an input interface of the second device, the AR overlay including second information related to authentication of a user, related to the first device, with the second device, and the AR overlay displaying one or more input elements of at least one of varying sizes, varying shapes, or at varying locations of the input interface of the second device;

determine, by the first device, that the input interface of the second device received an input from the user, wherein the determination is based on at least one of:

monitoring the input interface of the second device via the camera of the first device using one or more computer vision techniques, or receiving, by the first device and from the second device, information related to the input via a wireless communication connection between the first device and the second device; and perform, by the first device and based on determining whether an interaction occurred with the input interface of the second device, an action displaying supplemental information related to at least one of the second information, the second device, or the AR overlay.

16. The non-transitory computer-readable medium of claim 15, wherein the AR overlay is displayed to present the one or more input elements in a random layout.

17. The non-transitory computer-readable medium of claim 15, wherein the one or more input elements are different for at least one of:

different users, different transactions, or different devices.

18. The non-transitory computer-readable medium of claim 15, wherein the one or more instructions further cause the first device to:

cause translation of information associated with the interaction with the input interface of the second device; and cause verification of information associated with the translation of information.

19. The non-transitory computer-readable medium of claim 15, wherein the one or more instructions further cause the first device to:

cause translation of information associated with the interaction with the input interface of the second device, the interaction with the input interface of the second device being based on a random layout of the one or more input elements displayed by the AR overlay, and the random layout of the one or more input elements being different from a layout of the input interface of the second device; and cause verification of information associated with the translation of information.

20. The non-transitory computer-readable medium of claim 15, wherein the one or more instructions, that cause the first device to perform the action, cause the first device to:

authorize a transaction with the second device based on information indicating the interaction and the second information.

* * * * *